(12) United States Patent
Nasrabadi et al.

(10) Patent No.: US 9,775,046 B2
(45) Date of Patent: Sep. 26, 2017

(54) POWER MANAGEMENT

(75) Inventors: Mohammad Hossein Taghavi Nasrabadi, San Diego, CA (US); Hemanth Sampath, San Diego, CA (US); Santosh P. Abraham, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 511 days.

(21) Appl. No.: 12/550,718

(22) Filed: Aug. 31, 2009

(65) Prior Publication Data
US 2010/0331056 A1 Dec. 30, 2010

Related U.S. Application Data

(60) Provisional application No. 61/220,800, filed on Jun. 26, 2009.

(51) Int. Cl.
*H04W 52/02* (2009.01)
*H04W 16/14* (2009.01)
*H04W 88/08* (2009.01)
*H04W 88/10* (2009.01)

(52) U.S. Cl.
CPC ....... *H04W 16/14* (2013.01); *H04W 52/0245* (2013.01); *H04W 88/08* (2013.01); *H04W 88/10* (2013.01); *Y02B 60/50* (2013.01)

(58) Field of Classification Search
CPC . H04W 16/14; H04W 52/0245; H04W 88/08; H04W 88/10; Y02B 60/50
USPC ........................................................ 455/574
See application file for complete search history.

(56) References Cited

U.S. PATENT DOCUMENTS

| | | | |
|---|---|---|---|
| 6,459,901 B1 | 10/2002 | Chawla et al. | |
| 7,180,876 B1 * | 2/2007 | Henry et al. | 370/329 |
| 2003/0118015 A1 * | 6/2003 | Gunnarsson et al. | 370/389 |
| 2003/0147368 A1 | 8/2003 | Eitan et al. | |

(Continued)

FOREIGN PATENT DOCUMENTS

| | | |
|---|---|---|
| CN | 101193351 A | 6/2008 |
| CN | 101197653 A | 6/2008 |

(Continued)

OTHER PUBLICATIONS

Anonymous: "Method to increase power efficiency in a mixed GSM/UMTS network" Research Disclosure, Mason Publications, Hampshire, GB, vol. 471, No. 88, Jul. 1, 2003 (Jul. 1, 2003) XP007133045, p. 4 lines 23-40.

(Continued)

*Primary Examiner* — Yuwen Pan
*Assistant Examiner* — Fatuma Sherif
(74) *Attorney, Agent, or Firm* — Patterson & Sheridan, LLP

(57) ABSTRACT

An apparatus for wireless communications includes a processing system. The processing system is configured to turn off a first wireless interface configured to support communications within a first coverage area. The processing system is further configured to communicate with a second apparatus using a second wireless interface configured to support communications within a second coverage area greater than the first coverage area. The processing system is further configured to turn on the first wireless interface based on the communication with the second apparatus.

39 Claims, 6 Drawing Sheets

(56) References Cited

U.S. PATENT DOCUMENTS

| | | | |
|---|---|---|---|
| 2004/0203789 A1* | 10/2004 | Hammond et al. | 455/440 |
| 2004/0259558 A1 | 12/2004 | Skafidas et al. | |
| 2007/0153749 A1* | 7/2007 | Waxman | 370/338 |
| 2007/0159992 A1* | 7/2007 | Kim | 370/311 |
| 2007/0242621 A1 | 10/2007 | Nandagopalan et al. | |
| 2007/0265009 A1 | 11/2007 | Hamaguchi | |
| 2008/0046542 A1* | 2/2008 | Sano | 709/218 |
| 2008/0130481 A1 | 6/2008 | Fujii et al. | |
| 2008/0176521 A1* | 7/2008 | Singh et al. | 455/69 |
| 2008/0207230 A1 | 8/2008 | Jung et al. | |
| 2008/0259846 A1 | 10/2008 | Gonikberg et al. | |
| 2008/0261602 A1 | 10/2008 | Livneh | |
| 2009/0042593 A1 | 2/2009 | Yavuz et al. | |
| 2009/0080386 A1 | 3/2009 | Yavuz et al. | |
| 2009/0080499 A1 | 3/2009 | Yavuz et al. | |
| 2009/0082027 A1 | 3/2009 | Yavuz et al. | |
| 2009/0137241 A1 | 5/2009 | Yavuz et al. | |
| 2009/0168676 A1* | 7/2009 | Olson | 370/311 |
| 2009/0170542 A1 | 7/2009 | Chen et al. | |
| 2009/0196245 A1 | 8/2009 | Ji | |
| 2009/0247084 A1 | 10/2009 | Palanki | |
| 2009/0247181 A1 | 10/2009 | Palanki et al. | |
| 2009/0290550 A1 | 11/2009 | Bhattad et al. | |
| 2010/0008282 A1 | 1/2010 | Bhattad et al. | |
| 2010/0085924 A1 | 4/2010 | Hamabe et al. | |
| 2010/0240386 A1 | 9/2010 | Hamabe et al. | |
| 2010/0330917 A1 | 12/2010 | Choi et al. | |
| 2010/0330918 A1 | 12/2010 | Taghavi Nasrabadi et al. | |
| 2011/0019529 A1 | 1/2011 | Wang et al. | |
| 2011/0111779 A1 | 5/2011 | Krishnamurthy et al. | |
| 2011/0116480 A1 | 5/2011 | Li et al. | |

FOREIGN PATENT DOCUMENTS

| | | |
|---|---|---|
| EP | 1261141 | 11/2002 |
| JP | H06244785 A | 9/1994 |
| JP | 2005080197 A | 3/2005 |
| JP | 2005159965 A | 6/2005 |
| JP | 2007306201 A | 11/2007 |
| JP | 2008167413 A | 7/2008 |
| JP | 2008187555 A | 8/2008 |
| JP | 2008205765 A | 9/2008 |
| TW | M300925 U | 11/2006 |
| WO | WO2004079999 | 9/2004 |
| WO | WO-2004091244 A1 | 10/2004 |
| WO | 2008035661 A1 | 3/2008 |
| WO | WO2009068727 | 6/2009 |

OTHER PUBLICATIONS

International Search Report and Written Opinion—PCT/US2010/040079, International Search Authority—European Patent Office—dated Oct. 13, 2010.

Sarperi Luciano et al., "Avoiding data channel femto-macro interference," IEEE C802.16M-08/1366R1, IEEE, US, Nov. 12, 2008 (Nov. 12, 2008), pp. 1-3, XP007908600.

Sarperi Luciano et al., "Interference mitigation for closed user groups femtocells," IEEE C802.16M-08/1315R1, IEEE US, [OnLine] Oct. 31, 2008 (Oct. 31, 2008), pp. 1-4, XP007908599. Retrieved from the Internet: URL:<http://wirelessman.org/tgm/contrib/C80216m-08_1315rl.doc>.

Taiwan Search Report—TW099120954—TIPO—dated Dec. 18, 2013.

Wakukawa, T., et al., "Impress Standard Textbook Series, Mobile IP Textbook," Impress R & D, 1st ed., Mar. 21, 2009, pp. 24, ISBN: 978-4-8433-2687-8.

* cited by examiner

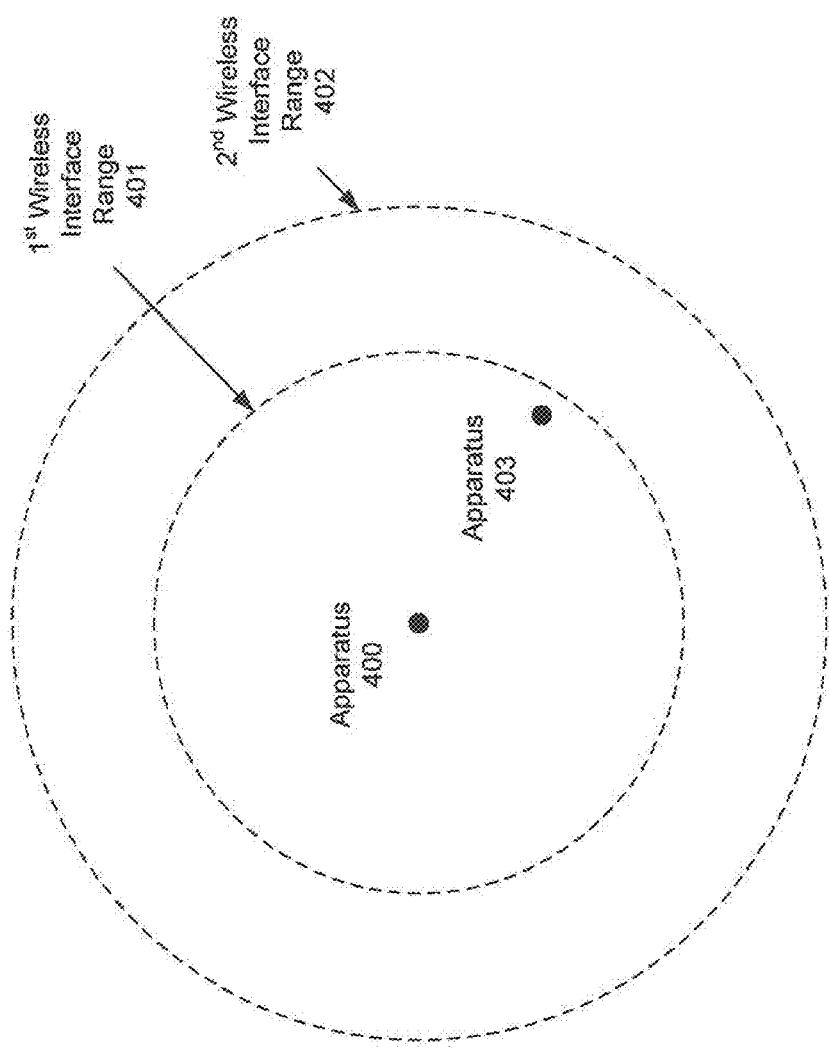

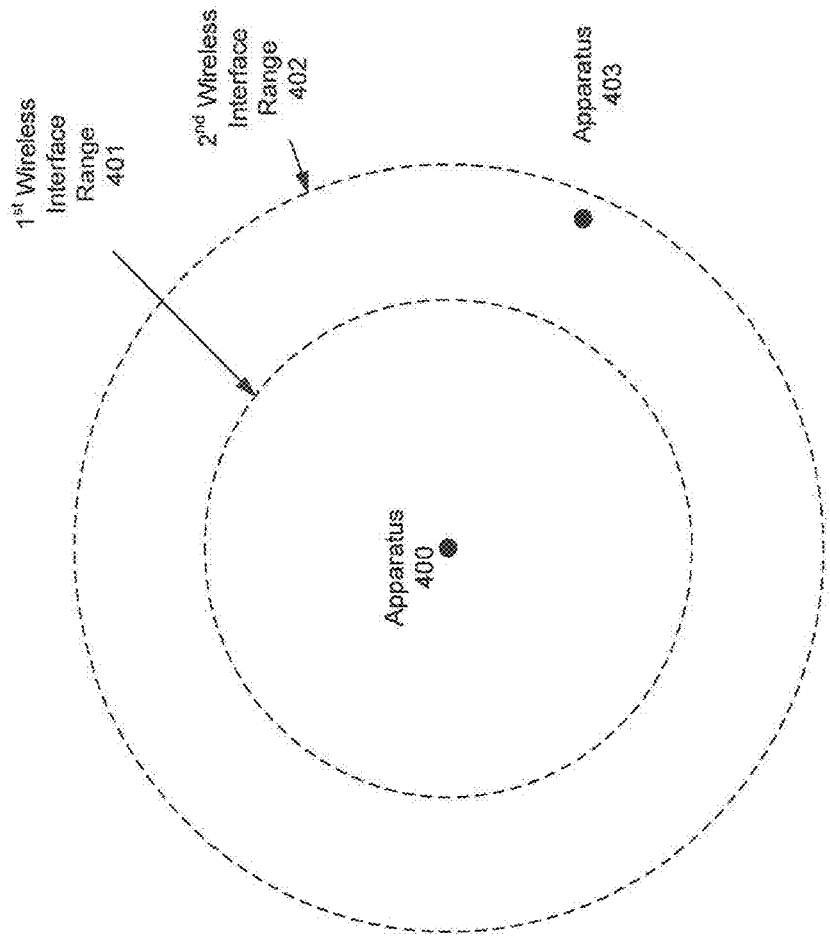

POWER MANAGEMENT

CROSS-REFERENCE TO RELATED APPLICATION(S)

Pursuant to 35 U.S.C. §119(e), this application claims the benefit of U.S. Provisional Application Ser. No. 61/220,800 filed on Jun. 26, 2009, the contents of which are hereby incorporated by reference herein in their entirety.

BACKGROUND

Field

The following description relates generally to communication systems and, more particularly, to power management.

Background

One of the main applications of high-frequency (HF) wireless systems such as 60 GHz devices, especially handsets, is rapid transfer of very large files. The traffic in such a communication scenario is transmitted in short, but high volume bursts. Between the transmissions, there is usually a long period of data inactivity, during which the HF radio on the handset may enter a sleep/power-save mode.

In a conventional power-save mode implementation, the HF radio wakes up periodically for short time periods to listen to the beacons in order not to miss any incoming data. In highly bursty traffic, the energy spent on these periodic wake ups during time periods of inactivity can constitute a large portion of the total energy consumed.

In addition, due to the higher path loss in HF channels, devices may experience signal loss (e.g., due to shadowing) for extended periods of time, during which connection to the access point (AP) over the HF link may be lost. Periodically waking up to monitor signal availability can consume large amount of energy.

As such, there is a need to improve power management in HF wireless systems.

SUMMARY

In an aspect of the disclosure, an apparatus for wireless communications includes a processing system. The processing system is configured to turn off a first wireless interface configured to support communications within a first coverage area. The processing system is further configured to communicate with a second apparatus using a second wireless interface configured to support communications within a second coverage area greater than the first coverage area. The processing system is further configured to turn on the first wireless interface based on the communication with the second apparatus.

In an aspect of the disclosure, a method for wireless communications is provided in which a first wireless interface, which is configured to support communications within a first coverage area, is turned off. A second wireless interface is used to communicate with an apparatus. The second wireless interface is configured to support communications within a second coverage area greater than the first coverage area. The first wireless interface is turned on based on the communication with the second apparatus.

In an aspect of the disclosure, an access point includes one or more antennas, a first wireless interface, a second wireless interface, and a processing system. The first wireless interface is configured to support communications within a first coverage area via at least one of the one or more antennas. The second wireless interface is configured to support communications within a second coverage area via at least one of the one or more antennas. The second coverage area is greater than the first coverage area. The processing system is configured to turn off the first wireless interface. The processing system is further configured to communicate with a second apparatus using the second wireless interface. The processing system is further configured to turn on the first wireless interface based on the communication with the second apparatus.

In an aspect of the disclosure, a station includes a first wireless interface, a second wireless interface, a user interface, and a processing system. The first wireless interface is configured to support communications within a first coverage area. The second wireless interface is configured to support communications within a second coverage area greater than the first coverage area. The processing system is configured to turn off the first wireless interface. The processing system is further configured to communicate with a second apparatus using the second wireless interface. The communication is based on input from the user interface. The processing system is further configured to turn on the first wireless interface based on the communication with the second apparatus.

BRIEF DESCRIPTION OF DRAWINGS

FIG. 4A is a conceptual diagram of two apparatuses in communication.

FIG. 4B is another conceptual diagram of two apparatuses in communication.

DETAILED DESCRIPTION

Figure 1:
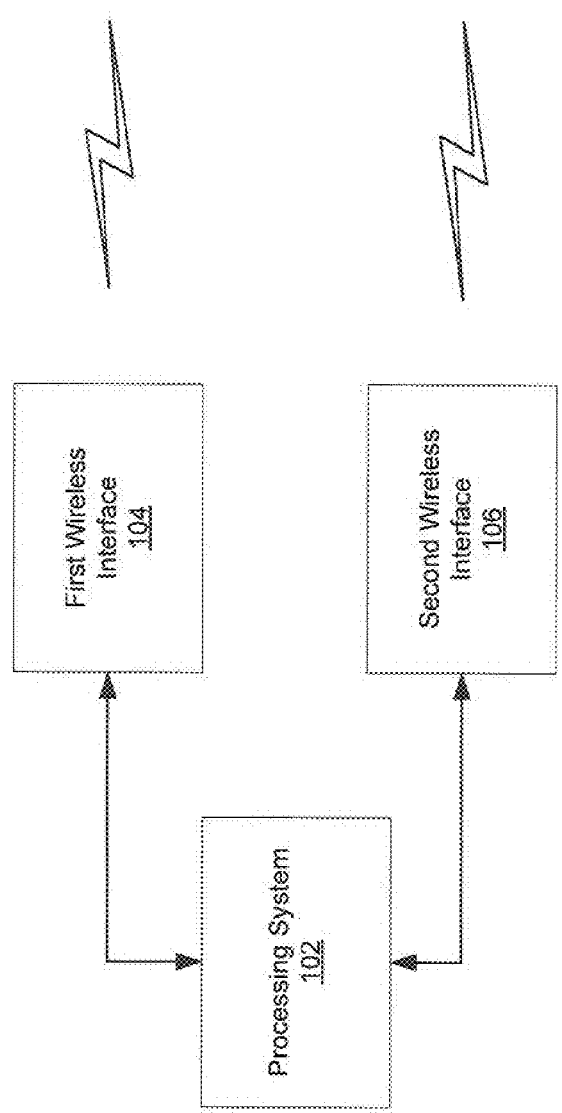
FIG. 1 is a conceptual block diagram illustrating a hardware configuration for an exemplary apparatus.

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, an access point (AP) and a station (STA) capable of operating in a wireless network. The wireless network may be configured to support APs and STAs employing Multiple-Input and Multiple-Output (MIMO) technology supporting any suitable wireless technology, such as Orthogonal Frequency Division Multiplexing (OFDM). An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard. The various concepts presented throughout this disclosure may also be extended to short range radio technology, such as Ultra-Wide Band (UWB), or some other short range air interface standard such as Bluetooth. The actual wireless technology and air interface standard employed for any particular network will depend on the specific application and the overall design constraints imposed on the system. The various concepts presented throughout this disclosure are equally applicable to a wireless network employing other wireless technologies and/or air interface standards.

The wireless network may support any number of APs distributed throughout a geographic region to provide coverage for STAs. An AP is generally a fixed terminal that provides backhaul services to STAs in the geographic region of coverage. However, the AP may be mobile in some applications. A STA, which may be fixed or mobile, utilizes the backhaul services of an AP or engages in peer-to-peer communications with other STAs. Examples of STAs include a mobile telephone, laptop computer, a personal digital assistant (PDA), a mobile digital audio player, a mobile game console, a digital camera, a digital camcorder, a mobile audio device, a mobile video device, a mobile multimedia device, or any other suitable device capable of supporting wireless communications.

An AP or STA may be referred to by those skilled in the art by different nomenclature. By way of example, an AP may be referred to as a base station, a base transceiver station, a wireless device, a terminal, a node, or some other suitable terminology. Similarly, a STA may be referred to as a user terminal, a mobile station, a subscriber station, a wireless device, a terminal, an access terminal, a node, or some other suitable terminology. The various concepts described throughout this disclosure are intended to apply to all suitable apparatuses regardless of their specific nomenclature.

Various aspects of an apparatus will now be presented with reference to FIG. 1. FIG. 1 is a conceptual block diagram illustrating a hardware configuration for an apparatus. The apparatus 100 may include a processing system 102, a first wireless interface 104, and a second wireless interface 106.

In one configuration, the first wireless interface 104 includes an HF radio for supporting higher frequency communications, and the second wireless interface 106 includes a lower frequency (LF) radio for supporting lower frequency communications. The LF radio may support legacy IEEE 802.11 (e.g., WiFi systems in the 2.4 GHz or 5 GHz bands), Bluetooth, cellular systems, or some other suitable air interface protocol. The HF radio may be a 60 GHz HF radio to support IEEE 802.11 ad (Extremely High Throughput). In one configuration, the LF radio is used for more frequent, but lower throughput communication with more coverage/range, and the HF radio is used for occasional, very high throughput file transfer with a shorter range.

Each wireless interface 104, 106 may also be configured to implement the physical layer by modulating wireless signals and performing other radio frequency (RF) front end processing. Alternatively, the physical layer processing function may be performed by the processing system 102.

The first and second wireless interfaces 104, 106 are shown as separate entities. However, as those skilled in the art will readily appreciate, the first and second wireless interfaces 104, 106 may be integrated into a single entity. Alternatively, the first and second wireless interfaces 104, 106, or any portion thereof, may be integrated into the processing system 102, or distributed across multiple entities within the apparatus 100.

The processing system 102 may be implemented with one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 102 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 102 to perform the various functions described below, as well as other protocol processing functions (e.g., data link layer processing).

Machine-readable media may include storage integrated into one or more of the processors. Machine-readable media may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

In one configuration of an apparatus, the LF radio (i.e., second wireless interface 106) may be used to inform a second apparatus if there is incoming traffic for the HF radio (i.e., first wireless interface). More specifically, during the power-save mode of the HF radio, the HF radio may be turned off completely, or woken up only occasionally to perform maintenance tasks that cannot be done by the LF radio. Once the source apparatus has data to transfer to the destination apparatus via the HF radio, the source apparatus notifies the destination apparatus through the LF radio to turn its HF radio on and provides HF bootstrap information, such as frame timing, HF channel, and scheduling information.

In a similar mechanism, if a dual-band apparatus (e.g., STA) experiences very low HF signal strength for an extended period of time, the dual-band apparatus may turn off its HF radio completely and perform all communication through the LF radio. The apparatus may use the LF radio to estimate the channel quality of the HF radio and to inform the HF radio to wake up once it is within the range of the HF radio of a second apparatus (e.g., AP).

Two power save modes may be defined for an HF radio of a STA: (1) short-term power-save (STPS) mode, and (2) long-term power-save (LTPS) mode. During the STPS mode, the STA turns on its HF radio periodically to listen to the HF beacons and to maintain its synchronism with the AP. The LTPS mode may be used when both the STA and the AP have compatible LF and HF radios. During the LTPS mode, the HF radio is turned off. Optionally, the STA loses its synchronism, and/or its association with the AP.

The support of the LTPS mode is negotiated between the AP and a STA and announced during a management frame (e.g., in the Capability IE). During the time when the HF radio is in the LTPS mode, the LF radio may enter and exit the STPS mode, depending on the corresponding link activity.

Communication between LF radios regarding the power management of HF radios may be in-band (e.g., using fields in MAC header) or out-of-band (e.g., using explicit messages). The advantage of in-band communication is that it has low overhead. The advantage of out-of-band communication is that the message can be decoded upon a software upgrade of legacy devices.

Figure 2:
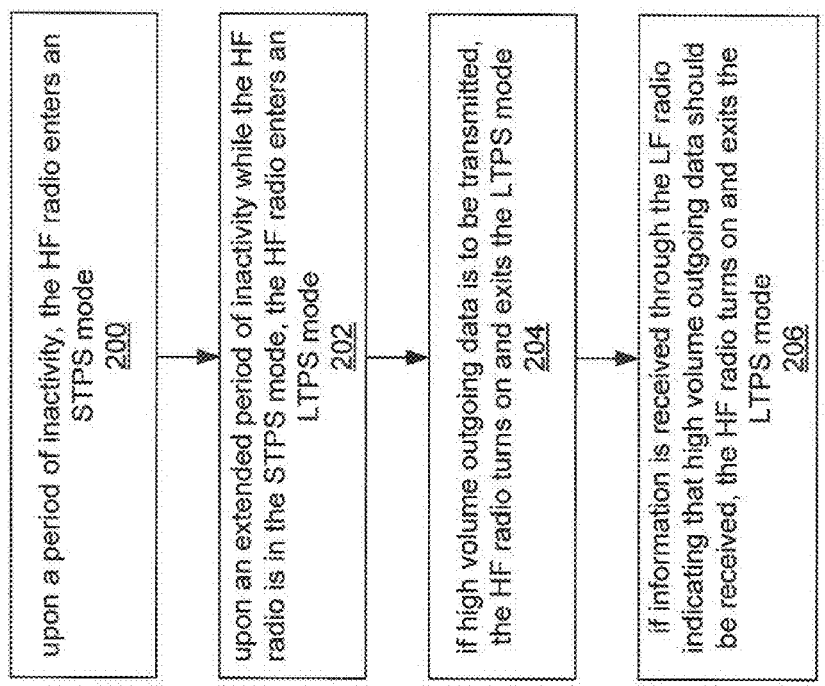
FIG. 2 is a flow chart for entering and exiting a long-term power-saving mode based on traffic activity.
Figure 3:
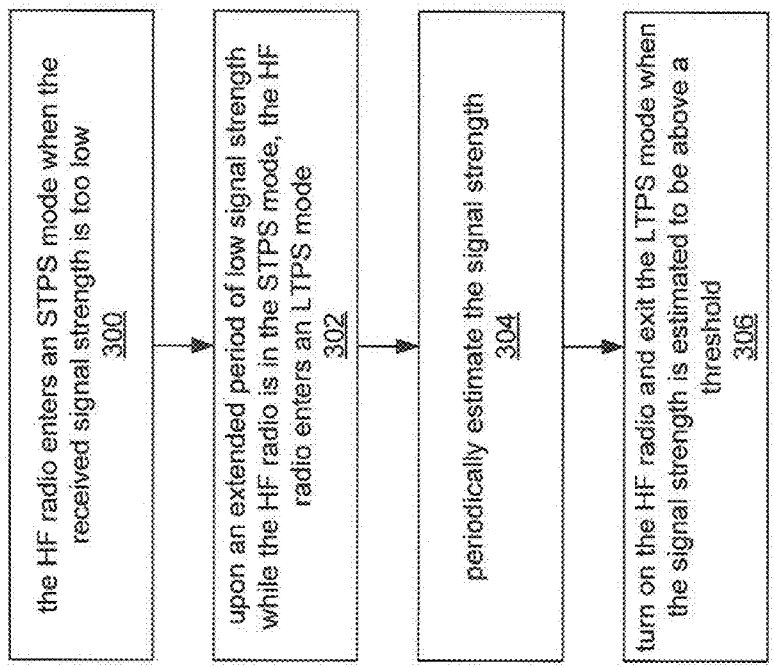
FIG. 3 is a flow chart for entering and exiting a long-term power-saving mode based on received signal strength.

The STA may enter or exit the LTPS mode based on traffic activity and/or signal strength. FIG. 2 is a flow chart for entering and exiting the LTPS mode based on traffic activity. FIG. 3 is a flow chart for entering and exiting the LTPS mode based on a received signal strength.

In a first configuration, during brief times of inactivity, the HF radio of the STA may enter the STPS mode (200). Once the STA enters the STPS mode, a waiting time (which may be implementation-dependent) starts with a countdown to enter the LTPS mode. If no incoming traffic is detected during this countdown period, the HF radio enters the LTPS mode and is turned off (202). If the STA has high-volume outgoing data to be transmitted over the HF radio, the STA will turn on its HF radio, thus exiting the LTPS mode (204). If the STA has high-volume incoming data to be received over the HF radio, the source STA inserts the information about the traffic into a MAC data unit, and sends the information about the traffic to the receiving STA (which is in LTPS mode) via the LF radio. Once the STA decodes the information about the incoming link, the STA turns the HF radio on in order to prepare for receiving the incoming traffic (206). If the STA is not synchronized, it synchronizes with the HF network by listening to the synchronizing beacon.

In a second configuration, if the received signal strength is lower than required for decoding the beacon messages, the HF radio of the STA may enter the STPS mode (300). Once the STA enters the STPS mode, a waiting time (which may be implementation-dependent) starts, counting down to enter the sleep mode. If during this countdown period the received signal strength does not reach the minimum required to decode the beacon, the HF radio enters the LTPS mode and is turned off (302). While the HF radio is in the LTPS mode, the STA through the LF radio periodically estimates the expected signal strength of the HF channel (304). Estimating the signal strength can be done by measuring the LF path loss and converting the estimated path loss to a predicted HF path loss using path loss equations and by considering the differences between the LF and HF links, such as frequency, antenna gains and directions, etc. A threshold is used to decide if the estimated HF signal strength will be sufficient for decoding HF beacons. Because these estimates are approximate, a margin may be added to the estimated signal strength, so that no opportunity for HF communication is missed. If possible, the two LF radios arrange for some pilots to be transmitted through similar transmission modes, e.g., using similar antenna patterns, to better estimate the HF channel conditions. If the estimated HF signal strength reaches the threshold, the STA turns the HF radio on in order to prepare for communication with the network (306). If the STA is not synchronized, it synchronizes with the HF network by listening to the synchronizing beacon.

A combination of the two protocols above may be used to control power-management modes based on both the traffic and the signal strength. In one configuration, the means for turning off the HF radio, the means for communicating with a second apparatus using the LF radio, and the means for turning on the HF radio based on the communication is the processing system 102.

FIG. 4A and FIG. 4B are conceptual diagrams of two apparatuses 400, 403 in communication. As depicted in FIG. 4A, the apparatuses 400, 403 are within the range 401 of the $1^{st}$ wireless interface 104 of the apparatus 400. As depicted in FIG. 4B, the apparatuses 400, 403 are outside the range 401 of the $1^{st}$ wireless interface 104 of the apparatus 400, but inside the range 402 of the $2^{nd}$ wireless interface 106 of the apparatus 400. As discussed supra, the $1^{st}$ wireless interface 104 may support shorter-range HF communications through the HF radio and the $2^{nd}$ wireless interface 106 may support longer-range LF communications through the LF radio. In one configuration, the apparatus 400 turns off the HF radio, communicates with the apparatus 403 using the LF radio, and turns on the HF radio based on the communication. The apparatus 400 may turn off the HF radio due to a time period of inactivity of the HF radio. Alternatively or in addition, the apparatus 400 may turn off the HF radio due to a low signal strength or a signal quality that indicates that the apparatus 400 is out of HF range 401 of the apparatus 403, as depicted in FIG. 2B.

When the apparatus 400 turns off the HF radio based on a signal quality from the apparatus 403, the apparatus 400 may estimate a potential signal quality through the HF radio based on a signal quality through the LF radio. The apparatus 400 may estimate the signal quality by determining a change in quality through the LF radio. Alternatively, the apparatus 200 may estimate the signal quality by exchanging reference signals with the apparatus 400 through the LF radio. Once the apparatus 400 determines that a signal quality through the HF radio would be sufficient, the apparatus 400 may turn on the HF radio if there are data to be received through the HF radio.

The apparatus 400 is configured to inform the apparatus 403 when the HF radio of the apparatus 400 is being turned off. The apparatus 400 may inform the apparatus 403 through either the HF radio or the LF radio. When the apparatus 400 determines that the HF radio should be used for communication, the apparatus 400 may then turn on the HF radio and inform the apparatus 403 that the HF radio of the apparatus 400 will be used to receive data from the apparatus 403. Communications with the apparatus 403 through the LF radio of the apparatus 400 may indicate to the apparatus 400 a potential improvement in signal quality through the HF radio, which may then lead the apparatus 400 to turn on the HF radio and request communication through the HF radio.

While the HF radio is in the LTPS mode, the apparatus 400 may place the LF radio in the STPS mode by periodically turning off the LF radio to save power while the HF radio is off.

Figure 5:
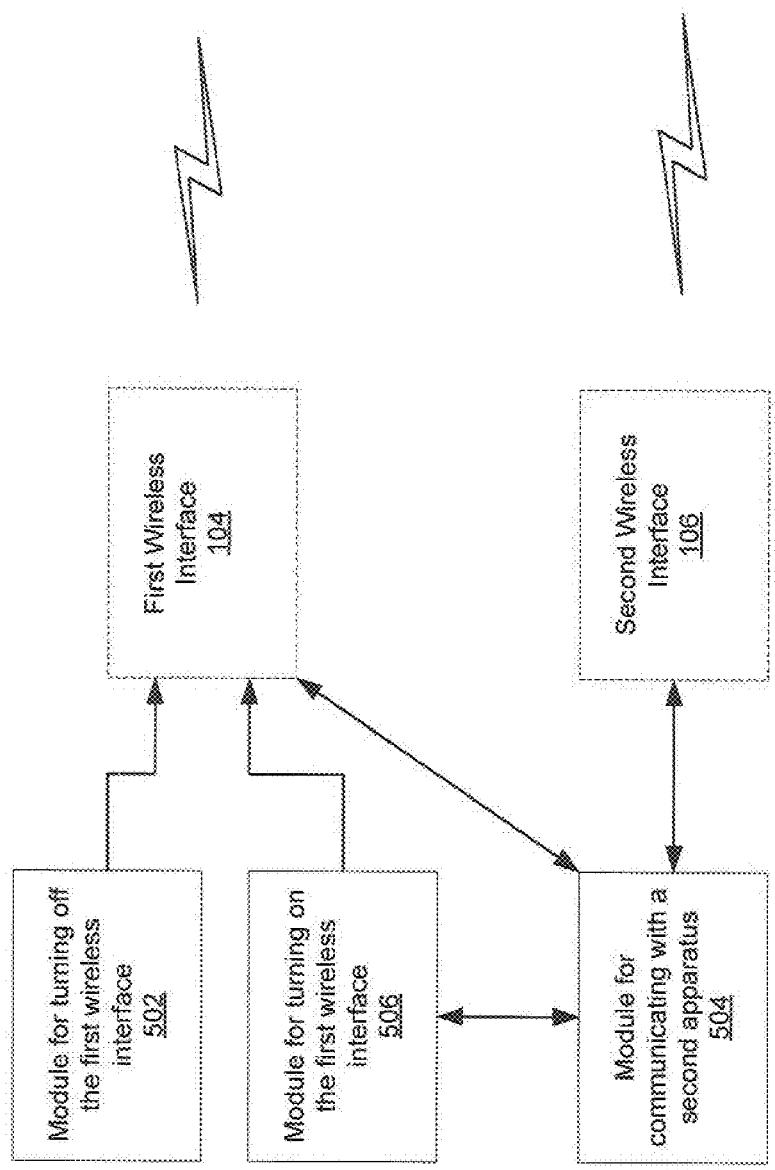
FIG. 5 is a conceptual block diagram illustrating the functionality of an exemplary apparatus.

FIG. 5 is a conceptual block diagram illustrating the functionality of an exemplary apparatus. The apparatus includes a module 502 for turning off a first wireless interface configured to support communications within a first coverage area, a module 504 for communicating with a second apparatus using a first wireless interface configured to support communications in a first coverage area or using a second wireless interface configured to support communications within a second coverage area greater than the first coverage area, and a module 506 for turning on the first wireless interface based on the communication with the second apparatus.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communications, comprising:
   a processing system configured to:
   provide an indication to a second apparatus that a first power savings mode for a first wireless interface will be entered, wherein the first wireless interface is configured to support communications within a first coverage area and wherein the processing system is further configured to provide the indication using either the first wireless interface or a second wireless interface configured to support communications within a second coverage area greater than the first coverage area;
   enter the first power savings mode for the first wireless interface based on a time period of inactivity of the first wireless interface;
   communicate with the second apparatus using the second wireless interface; and
   exit the first power savings mode based on the communication with the second apparatus.

2. The apparatus of claim 1, wherein the first wireless interface is associated with a first frequency and the second wireless interface is associated with a second frequency lower than the first frequency.

3. The apparatus of claim 1, wherein the processing system is further configured to use the second wireless interface to provide an indication to the second apparatus that the first wireless interface will be used to receive data from the second apparatus or to receive an indication of a potential improvement in a quality of signal reception.

4. The apparatus of claim 1, wherein the processing system is further configured to periodically enter a second power savings mode for the second wireless interface to save power while the first wireless interface is in the first power savings mode.

5. The apparatus of claim 1, wherein the processing system is further configured to support either one of in-band and out-of-band communications with the second apparatus.

6. The apparatus of claim 1, wherein the processing system is further configured to enter the first power savings mode based on a quality of signal reception via the first wireless interface.

7. The apparatus of claim 1, wherein the processing system is configured to:
   estimate a quality of signal reception via the first wireless interface based on a quality of signal reception via the second wireless interface; and
   exit the first power savings mode based on the estimated quality of signal reception.

8. The apparatus of claim 1, wherein entering the first power savings mode for the first wireless interface comprises turning off the first wireless interface and exiting the first power savings mode comprises turning on the first wireless interface.

9. The apparatus of claim 6, wherein the processing system is further configured to estimate the quality of signal reception via the first wireless interface based on a quality of signal reception via the second wireless interface.

10. The apparatus of claim 9, wherein the processing system is further configured to estimate the quality of signal reception via the first wireless interface by determining a change in the quality of signal reception via the second wireless interface.

11. The apparatus of claim 9, wherein the processing system is further configured to estimate the quality of signal reception via the first wireless interface by exchanging reference signals with the second apparatus via the second wireless interface.

12. A method for wireless communications, comprising:
   providing an indication to an apparatus that a first power savings mode for a first wireless interface will be entered, wherein the first wireless interface is configured to support communications within a first coverage area and wherein the indication is provided using either the first wireless interface or a second wireless interface configured to support communications within a second coverage area greater than the first coverage area;
   entering the first power savings mode for the first wireless interface, wherein entering the first power savings mode is based on a time period of inactivity of the first wireless interface;
   communicating with the apparatus using the second wireless interface; and
   exiting the first power savings mode based on the communication with the apparatus.

13. The method of claim 12, wherein the first wireless interface is associated with a first frequency and the second wireless interface is associated with a second frequency lower than the first frequency.

14. The method of claim 12, further comprising using the second wireless interface to provide an indication to the apparatus that the first wireless interface will be used to receive data from the apparatus or to receive an indication of a potential improvement in a quality of signal reception.

15. The method of claim 12, further comprising periodically entering a second power savings mode for the second wireless interface to save power while the first wireless interface is in the first power savings mode.

16. The method of claim 12, further comprising supporting either one of in-band and out-of-band communications with the apparatus.

17. The method of claim 12, wherein entering the first power savings mode is based on a quality of signal reception via the first wireless interface.

18. The method of claim 12, further comprising estimating a quality of signal reception via the first wireless interface based on a quality of signal reception via the second wireless interface, wherein exiting the first power savings mode is based on the estimated quality of signal reception.

19. The method of claim 12, wherein entering the first power savings mode for the first wireless interface comprises turning off the first wireless interface and exiting the first power savings mode comprises turning on the first wireless interface.

20. The method of claim 17, further comprising estimating the quality of signal reception via the first wireless interface based on a quality of signal reception via the second wireless interface.

21. The method of claim 20, wherein the quality of signal reception is estimated via the first wireless interface by determining a change in the quality of signal reception via the second wireless interface.

22. The method of claim 20, wherein the quality of signal reception is estimated via the first wireless interface by exchanging reference signals with the apparatus via the second wireless interface.

23. An apparatus for wireless communications, comprising:
    means for providing an indication to a second apparatus that a first power savings mode for a first wireless interface will be entered, wherein the first wireless interface is configured to support communications within a first coverage area and wherein the indication is provided using either the first wireless interface or a second wireless interface configured to support communications within a second coverage area greater than the first coverage area;
    means for entering the first power savings mode for the first wireless interface, wherein entering the first power savings mode is based on a time period of inactivity of the first wireless interface;
    means for communicating with the second apparatus using the second wireless interface; and
    means for exiting the first power savings mode based on the communication with the second apparatus.

24. The apparatus of claim 23, wherein the first wireless interface is associated with a first frequency and the second wireless interface is associated with a second frequency lower than the first frequency.

25. The apparatus of claim 23, further comprising means for using the second wireless interface to provide an indication to the second apparatus that the first wireless interface will be used to receive data from the second apparatus or to receive an indication of a potential improvement in a quality of signal reception.

26. The apparatus of claim 23, further comprising means for periodically entering a second power savings mode for the second wireless interface to save power while the first wireless interface is in the first power savings mode.

27. The apparatus of claim 23, further comprising means for supporting either one of in-band and out-of-band communications with the apparatus.

28. The apparatus of claim 23, wherein entering the first power savings mode is based on a quality of signal reception via the first wireless interface.

29. The apparatus of claim 23, further comprising means for estimating a quality of signal reception via the first wireless interface based on a signal reception via the second wireless interface, wherein the means for exiting the first power savings mode exits the first power savings mode based on the estimated quality of signal reception.

30. The apparatus of claim 23, wherein entering the first power savings mode for the first wireless interface comprises turning off the first wireless interface and exiting the first power savings mode comprises turning on the first wireless interface.

31. The apparatus of claim 28, further comprising means for estimating the quality of signal reception via the first wireless interface based on a quality of signal reception via the second wireless interface.

32. The apparatus of claim 31, wherein the quality of signal reception is estimated via the first wireless interface by determining a change in the quality of signal reception via the second wireless interface.

33. The apparatus of claim 31, wherein the quality of signal reception is estimated via the first wireless interface by exchanging reference signals with the second apparatus via the second wireless interface.

34. A computer-program product for communication, comprising:
    a machine-readable storage device encoded with instructions executable to:
        provide an indication to an apparatus that a first power savings mode for a first wireless interface will be entered, wherein the first wireless interface is configured to support communications within a first coverage area and wherein the indication is provided using either the first wireless interface or a second wireless interface configured to support communications within a second coverage area greater than the first coverage area;
        enter the first power savings mode for the first wireless interface, wherein entering the first power savings mode is based on a time period of inactivity of the first wireless interface;
        communicate with the apparatus using the second wireless interface; and
        exit the first power savings mode based on the communication with the apparatus.

35. The computer-program product for communication of claim 34, wherein entering the first power savings mode for the first wireless interface comprises turning off the first wireless interface and exiting the first power savings mode comprises turning on the first wireless interface.

36. An access point, comprising:
    one or more antennas;
    a first wireless interface configured to support communications within a first coverage area via at least one of the one or more antennas;
    a second wireless interface configured to support communications within a second coverage area via at least one of the one or more antennas, wherein the second coverage area is greater than the first coverage area;
    a processing system configured to:
        provide an indication to a wireless node that a first power savings mode for the first wireless interface will be entered, wherein the indication is provided using either one of the first or second wireless interfaces;

enter the first power savings mode for the first wireless interface based on a time period of inactivity of the first wireless interface;

communicate with the wireless node using the second wireless interface; and exit the first power savings mode based on the communication with the wireless node.

37. The access point of claim 36, wherein entering the first power savings mode for the first wireless interface comprises turning off the first wireless interface and exiting the first power savings mode comprises turning on the first wireless interface.

38. A station, comprising:
a first wireless interface configured to support communications within a first coverage area;
a second wireless interface configured to support communications within a second coverage area greater than the first coverage area;
a user interface;
a processing system configured to:
provide an indication to a wireless node that a first power savings mode for the first wireless interface will be entered, wherein the indication is provided using either one of the first or second wireless interfaces;

enter the first power savings mode for the first wireless interface based on a time period of inactivity of the first wireless interface;

communicate with the wireless node using the second wireless interface, the communication being based on input from the user interface; and exit the first power savings mode based on the communication with the wireless node.

39. The station of claim 38, wherein entering the first power savings mode for the first wireless interface comprises turning off the first wireless interface and exiting the first power savings mode comprises turning on the first wireless interface.

* * * * *